United States Patent [19]
Geiser

[11] Patent Number: 5,941,166
[45] Date of Patent: Aug. 24, 1999

[54] ROUND BALER

[75] Inventor: Jens Geiser, Dettum, Germany

[73] Assignee: Deere & Company, Moline, Ill.

[21] Appl. No.: 09/014,237

[22] Filed: Jan. 27, 1998

[30] Foreign Application Priority Data

Feb. 14, 1997 [DE] Germany .............................. 197 05 582

[51] Int. Cl.[6] .............................. B65B 13/04; A01F 15/07
[52] U.S. Cl. .................................. 100/5; 100/6; 100/13; 100/88; 100/98 R; 56/341
[58] Field of Search .............................. 100/5, 6, 13, 87, 100/88, 89, 94–97, 98 R; 56/341

[56] References Cited

U.S. PATENT DOCUMENTS

| | | | |
|---|---|---|---|
| 4,549,481 | 10/1985 | Groeneveld et al. | 100/98 R |
| 4,619,106 | 10/1986 | van der Lely | 100/89 |
| 4,793,249 | 12/1988 | Wellman . | |
| 4,955,188 | 9/1990 | von Allwörden | 100/6 |
| 5,170,701 | 12/1992 | Viaud . | |
| 5,388,504 | 2/1995 | Kluver . | |
| 5,419,108 | 5/1995 | Webb et al. . | |
| 5,802,825 | 9/1998 | Chow et al. | 100/88 |

FOREIGN PATENT DOCUMENTS

| | | |
|---|---|---|
| 0 689 760 | 1/1996 | European Pat. Off. . |
| 34 43 530 | 6/1985 | Germany . |
| 41 32 664 | 4/1993 | Germany . |

*Primary Examiner*—Stephen F. Gerrity

[57] ABSTRACT

A round baler is equipped with a mechanism for wrapping the bale with twine. In order to keep the end of the twine from coming loose after ejection of the round bale, there is provided a groove shaper which engages the bale and forms a circumferential groove therein in line with the location where the twine dispensing arm of the wrapping mechanism comes to rest at the conclusion of wrapping a bale. The tension of the length of twine extending between the bale and the dispensing arm causes the final wrap or wraps of twine to be pulled into the groove prior to the wrapped twine being severed from a supply roll.

6 Claims, 1 Drawing Sheet

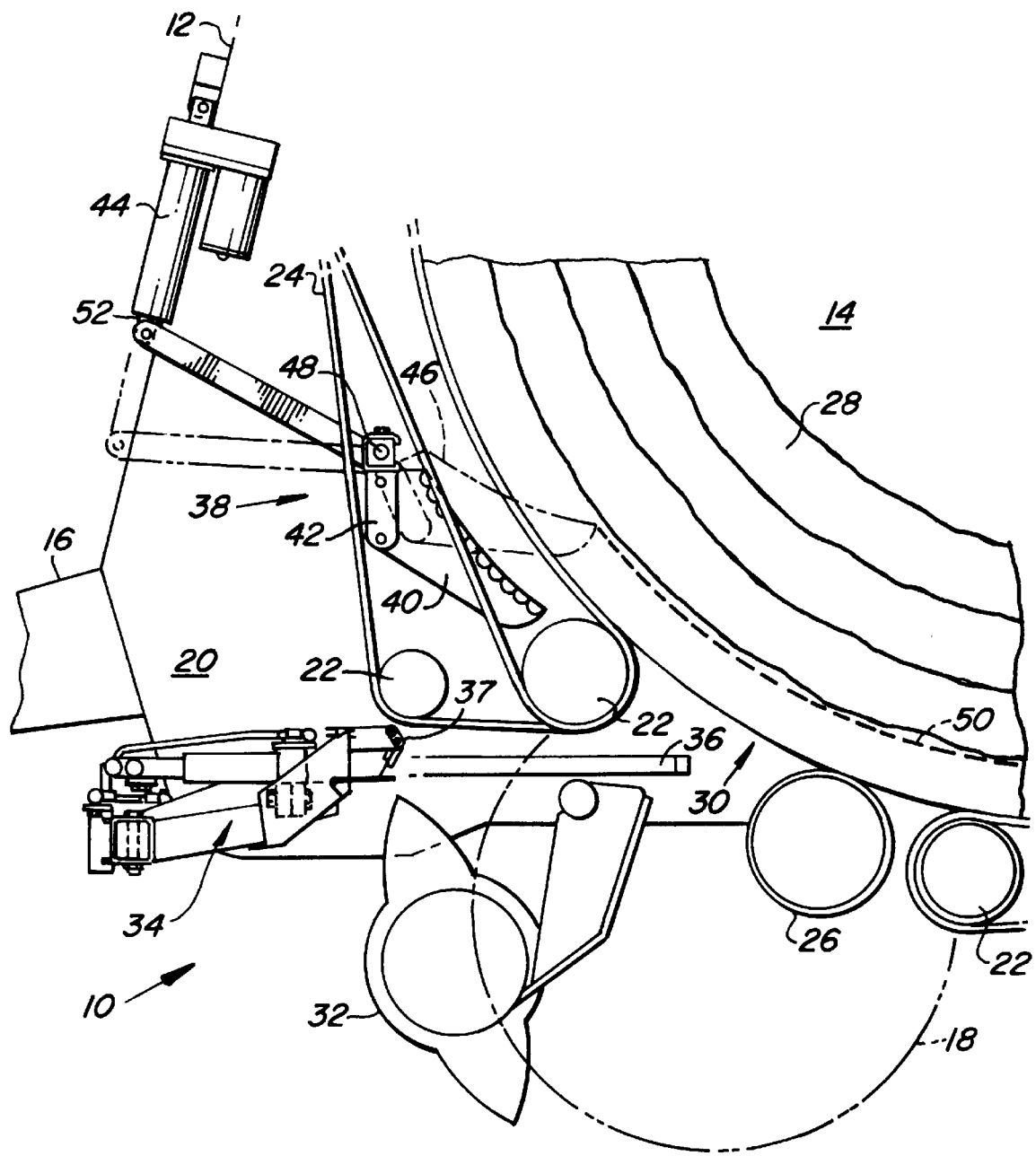

ROUND BALER

BACKGROUND OF THE INVENTION

The present invention relates so-called large round balers, and more specifically relates to wrapping cylindrical bales of agricultural crops formed in the chambers of large round balers with twine.

It is conventional to wrap cylindrical bales with twine in order to prevent the baled crop from falling apart after being ejected from the baling chamber. These known wrapping devices merely wrap twine onto the circumference of the bale so that, after the twine wrapped on the bale is severed from a supply of twine, the end of the twine is not fastened and lies loosely upon the bale surface. Therefore, depending on the direction of rotation of the bale after it is ejected from the baling chamber, it is possible that the end of the twine will become unwrapped from the bale, with the consequence that the bale falls apart and/or the loose end of the twine interferes with further handling of the bale. U.S. Pat. No. 4,793,249, granted on Dec. 27, 1988, and U.S. Pat. No. 5,170,701, granted on Dec. 15, 1992, disclose known wrapping devices of this type.

DE 41 32 664 C2 reveals a round baler having a wrapping device like that just described but further includes a first embodiment comprising a toothed wheel mounted in a slot provided in the side wall of the baling chamber, with at least one of the teeth being grooved for engaging twine guided into its path of rotation and embedding the engaged twine into the end of the bale as the wheel is being rotated by the rotating bale, and a second embodiment in which the loose twine end is fastened with an adhesive tape wrapped around the bale.

The problem underlying the invention is seen in the fact that this type of securing of the ends of the twine is relatively costly.

SUMMARY OF THE INVENTION

According to the present invention, there is provided an improved structure for embedding twine end sections into a bale.

A broad object of the invention is to provide a twine embedding structure comprising a groove forming device operable for making a circumferential groove or slot in the surface of a bale ready to be wrapped with twine, with the tensioned twine being pulled into the groove and being frictionally held there A more specific object of the invention is to provide a twine embedding structure as set forth in the previous object wherein the groove forming device comprises a knife structure including a blade which moves between a rest position, elevated away from the bale surface, and a cutting position at a desired depth into the bale, the groove being formed due to rotation of the bale during and after insertion of the knife to the desired cutting position.

Yet another object of the invention is to provide a twine embedding structure having a knife, as set forth in the immediately preceding object, wherein the blade is mounted for being moved between its rest and cutting positions by an electric or hydraulic motor acting on a knife-carrying lever or, alternatively, acting to reciprocate the knife along a straight path.

These and other objects will become apparent from a reading of the ensuing description together with the appended drawing.

BRIEF DESCRIPTION OF THE DRAWING

The sole FIGURE is a schematic left side elevational view of a forward portion of a large round baler embodying the present invention.

DESCRIPTION OF THE PREFERRED EMBODIMENT

The drawing shows a front section of a round baler 10 including a frame 12, in part defining a baling chamber 14, and being connected through a tongue 16 to a towing vehicle, for example, an agricultural tractor, and being supported on ground wheels 18.

The frame 12 includes opposite vertical side walls 20 that extend in the direction of travel, with the tongue 16 including a part extending between and joined to the side walls.

In this embodiment, a plurality of rolls 22 carry baling elements configured as a plurality of belts 24 mounted on the rolls 22 in side-by-side relationship between the side walls 20, as is known practice. In a lower central region of the drawing is an inlet 30 through which crop may be fed into the baling chamber 14, the inlet being located between a roll 26 at the bottom of the chamber 14 and one of the rolls 22 at the lower front region of the chamber 14. The roll 26 serves to at least partially support a bale formed in the chamber 14, such as the illustrated bale 28. Crop taken up from the ground is conveyed by means of a pick-up, not shown, and an undershot conveyor 32 through the inlet 30 to the baling chamber 14 where it is wound, by the action of the belts 24, to form the cylindrical bale 28.

The arrangement of a round baler 10 having bale-forming belts 24 is not absolutely required. Rather the baling chamber 14 may also be bordered by bale-forming rolls arranged generally on a circle, or may be bordered by bar chain conveyors that are moved along a predetermined fixed or variable path. Finally, mixed arrangements of fixed or movable belts, bar chain conveyors and rolls may be employed.

A twine wrapping mechanism 34 is supported beneath the tongue 16 and above the conveyor 32 and serves to draw twine (not shown) off a supply roll and deliver it to the circumference of the bale 28 so that the bale can carry the twine along during its rotation. In a conventional manner, the wrapping arrangement 34 includes a twine guide 36 in the form of a dispensing arm which can be moved in a generally horizontal plane. The twine guide 36 can be brought from a position away from the bale 28 to a position close to it, and, at the end of the wrapping process, is located to great advantage at the center of the bale, although any other position, for example, at the side is possible. The wrapping arrangement 34 may also be mounted to a different region of the frame 12, for example, upper or rear regions of the round baler 10 are possible depending on the type and arrangement of bale-forming elements being used.

The wrapping arrangement 34 is associated with a cutting arrangement, shown partly at 37, including a knife that acts against an anvil to cut the twine at a location between the twine guide 36 and the bale 28 so as to separate the wrapped twine from the twine held by the supply roll when a sufficient amount of twine has been wrapped onto the bale. Conventionally, this cutting arrangement is configured and arranged in such a way that the strand or strands of twine are guided between the anvil and the knife at the end of the wrapping process at a predetermined point in time. In the case of the round baler of the present invention, this point in time can be controlled in such a way that the twine is severed only when a sufficient amount has been wrapped about the bale 28.

The bale-forming belts 24 are mounted side-by-side over the length of the belt-support rolls extending between the side walls 20, with gaps between the belts being in the neighborhood of 5 to 10 millimeters.

In the embodiment shown, a groove shaper or former 38 is located forwardly and upwardly from that one of the belt support rolls 22 which borders the front of the crop inlet 30. In the preferred embodiment, the shaper 38 includes a groove-forming tool in the form of a knife 40, a pivotally mounted knife carrier or support arm 42 and a knife control motor 44. It is noted that the groove-forming tool could be a simple piece of flat rolled steel or a piece of sheet metal or the like.

Specifically, the groove shaper 38 is configured as a movable device, whereby the knife can be moved between a lower rest position, shown in solid lines, outside the baling chamber 14, to an upper cutting position, shown in dashed lines, inside the baling chamber. While the groove shaper may include a fixed groove forming tool, there are a number of advantages to arranging the tool so as to be retractable. One advantage is that a retractable groove forming tool cannot cut the bale into several slices from the core outward as could happen particularly in the case of a baler equipped with an expandable baling chamber. Furthermore, with the groove forming tool retracted, resistance to rolling up a bale is kept low and the danger of blockages due to the presence of the tool is low or hardly existent. Additionally, with the tool retracted after the groove is formed, there is no possibility that the shaping tool will interfere with or perhaps destroy the twine while it is being deposited in the groove. The depth of the groove 50 may be up to 60 to 70 mm., for example, with the idea that it will contain one wrap or coil of the twine. The movement of the groove shaper 38 is controlled automatically or arbitrarily by an arrangement, not shown.

In the preferred embodiment, the knife 40 is rigidly, but removably fixed, to the pivot arm 42 so that it can be removed or reassembled for the purposes of sharpening or adjustment. The knife 40 is provided with a curved cutting edge 46 formed by a plurality of teeth, serrations or the like, which increase the cutting ability of the knife. The curve of the cutting edge 46 is designed in such a way that a lower portion of the edge 46 first engages the bale 28, which is rotating in a counterclockwise direction as viewed in the drawing, while an upper portion of the edge 46 remains in the region between adjacent bale-forming belts 24.

If it is desired to reduce the resistance of the entry of the knife 42 into the bale 28, the knife may be configured as a rotating circular cutter, which is pressed into the circumferential surface of the bale. Under very particular conditions, for example, with a very high density bale surface, the circular knife may be driven resulting in the groove being sawed into the bale.

The knife support arm 42 is approximately right-angular having a short and a long leg and is mounted for pivoting about a transverse bearing axis 48 located at the juncture of the two legs. The longer of the legs of the arm 42 extends away from the baling chamber 14 and the motor 44 is connected to a free end of this leg while the knife 40 is mounted along the length of the shorter leg. It should be noted however that the lengths of the legs of the pivot arm 42 can be selected to agree with the power available and the stroke of the motor 44. For example, while the leg to which the knife 40 is connected could be three or four times as long according to another embodiment, not shown. Furthermore, the knife 40 may also be directly attached to the pivot axis 48 and pivoted by the arm 42, that is pivot by itself along a circular path. This arrangement would be particularly advantageous if several knives 40 were to be spaced for cutting several grooves along the length of a bale 14, in which case the knives would be mounted to a shaft located along the axis 48 and to which would be fixed an arm or crank coupled to the motor 44 for being operated to pivot the shaft and all of the knives in concert. The pivot arm 42 must be dimensioned and arranged in such a way that it does not interfere with the running of the bale-forming belts 24. By varying the relative position of the pivot arm 42 with respect to the knife 40, the stroke of the motor 44 can be compensated for or the pivot path can be adjusted.

The motor 44 may be driven electrically as well as hydraulically. It is also possible that instead of employing the motor 44, that a mechanical linkage or a rope pull may be used to pivot arm 42 and, hence, the knife 40. In the preferred embodiment, the motor 44 is electric since control for such a motor is most easy. According to the drawing, the electric motor 44 is provided with a threaded spindle 52 that is pivotally connected to the pivot arm 42. It can be seen that the knife 40 penetrates the bale 28 when the threaded spindle 52 is extended, and withdraws therefrom when the threaded spindle is retracted.

As soon as the knife 40 is pressed into the bale 28, the groove or slot 50 of narrow width is formed which can accommodate the loose twine end(s). Depending on the configuration of the knife 40 or its cutting edge 46, the slot or groove 50 can either be sharp-edged or V-shaped. The sharp-edged slot generates a higher non-positive lock on the twine while the V-shaped groove permits easier entry of the twine. The timing of the movement of the knife 40 into the baling chamber 14 can be optimized and automated if its movement is controlled by an arrangement which operates in response to the diameter of the bale so as to introduce the knife 40 into the baling chamber shortly before the bale reaches its desired or maximum diameter.

If the twine delivery system is designed to produce multiple loose twine ends along the circumference of the bale, several grooves 50 must be provided and respective knives 40 must be employed that are arranged at a distance from one another. The knives 40 may be manufactured especially for this purpose, or they may be knives that are already used in cutting arrangements of other round balers or self-loading forage boxes. At this same time, care should be taken that the crop is interwoven over the depth of the approximately 70 mm. deep groove, since otherwise the crop could separate from the core of the bale into strips between grooves.

Instead of being inserted between the bale-forming belts 24, as shown, the groove forming device could be introduced into the baling chamber 14 through the inlet 30. In such an embodiment, the knife could be guided linearly into the chamber by a guide rail, for example.

On the basis of the configuration described above, the round baler, according to the invention, operates as follows.

As soon as the bale 28 has reached the desired or the maximum size in the baling chamber 14, the motor 44 is actuated to cause to spindle 52 to extend to cause the arm 42 to be pivoted to carry the knife 40 into engagement with the rotating bale 28. The knife 40 will cause the groove 50 to be formed in the surface of the bale. The wrapping arrangement is then automatically or manually put into operation, and the twine guide 36 guides the twine end or twine ends up to the rotating bale 28 which carries the end(s) along and thereby initiates the wrapping process. During the wrapping process, the twine guide 36 moves back-and-forth along the longitudinal axis of the bale 28 and finally occupies a position in which the end of the guide remains aligned with the groove 50. After the twine has entered the groove 50, it is drawn deeply into the groove 50 by virtue of the twine being under tension while the bale 28 continues to rotate. Movement of the twine into the groove could be enhanced by increasing the tension on the twine at this point. When a sufficient amount of twine has been introduced into the groove 50, the cutting arrangement 37 of the wrapping arrangement 34 is actuated and the twine is cut. While the arrangement 37 is conventional, a cutter could be associated with the groove shaper 38 which is moved into a cutting position after a sufficient amount of twine has been wrapped with a final loop being placed in the groove 50. Finally, the bale 28 is ejected from the baling chamber 14.

Although the twine could be inserted into the groove 50 by hand, it is nevertheless advantageous for the reduction in the wrapping time, to insert the twine into the groove by means of the twine guide 36 that is already available. Also, instead of the twine guide stopping in alignment with the groove 50, it is obvious that fingers, lugs or the like separate from the twine guide could be provided for the purpose of guiding and inserting the twine into the groove while the twine guide is at another location.

Depending on the type of crop, it may be necessary or at least advantageous if the crop is secured at the side of the groove with several wraps of twine in such a way that the crop does not unravel in the wall region of the groove 50 and thereby still assures an adequate binding if the strands of twine that lie close to the groove slide over the side edge into the groove 50. Preferably the groove 50 is cut into the center of the bale 28, so that the strands of twine close to the groove 50 do not slide off the side surface of the bale or the groove 50 opens at its side.

I claim:

1. In a round baler including a baling chamber defined in part by a plurality of baling elements arranged for rolling up cylindrical bales within said chamber, and a twine wrapping arrangement including a twine guide movable longitudinally along a bale and including at least one twine outlet for dispensing twine onto the circumference of a bale while the bale is being rotated within the baling chamber and a twine cutting knife operable for severing a wrapped length of twine from a twine source, the improvement comprising: said twine wrapping arrangement further including at least one groove shaper for cutting a circumferential groove into a surface location of said bale for receiving a final wrap of said length of twine prior to it being severed by said twine cutting knife.

2. The round baler defined in claim 1 wherein said groove shaper includes a groove cutting knife; a knife carrier; said knife being mounted to said carrier; said carrier being mounted for moving said knife between a rest position located outside said baling chamber and a cutting position located within said baling chamber; and an operating structure coupled to said mounting structure for selectively effecting movement of the latter for causing movement of said knife between said rest and cutting positions.

3. The round baler defined in claim 2 wherein said groove cutting knife is in the form of a flat blade having a sharpened cutting edge; said blade being fixed to said mounting structure; said bale forming elements including a plurality of side-by-side arranged bale-forming belts defining gaps between adjacent belts; said knife being located for movement, operation of said mounting structure, through a respective one of said gaps as it moves between said rest and cutting positions.

4. The round baler defined in claim 3 wherein said operating structure includes a powered motor having an extendable and retractable plunger; and said mounting structure including an arm mounted for pivoting about a transverse axis and having a first leg coupled to said plunger and a second leg coupled to said knife.

5. The round baler defined in claim 3 wherein said cutting edge is curved and is serrated.

6. The round baler defined in claim 1 wherein the groove shaper is located such that the groove formed thereby is aligned with an end location occupied by said twine outlet which the latter occupies at the end of the wrapping process, whereby at least a final wrap of twine enters said groove.

\* \* \* \* \*